F. S. SEE.
DIRIGIBLE HEADLAMP.
APPLICATION FILED SEPT. 30, 1919.

1,404,148.

Patented Jan. 17, 1922.

WITNESS:
Geo. Ackman Jr.

INVENTOR.
BY F. S. See
Victor J. Evans
ATTORNEY.

UNITED STATES PATENT OFFICE.

FILER S. SEE, OF GEM, KANSAS.

DIRIGIBLE HEADLAMP.

1,404,148. Specification of Letters Patent. Patented Jan. 17, 1922.

Application filed September 30, 1919. Serial No. 327,608.

*To all whom it may concern:*

Be it known that I, FILER S. SEE, a citizen of the United States, residing at Gem, in the county of Thomas and State of Kansas, have invented new and useful Improvements in Dirigible Headlamps, of which the following is a specification.

This invention relates to dirigible headlamps, the object in view being to provide a simple mechanism adapted to be mounted upon the front axle of a motor vehicle, whereby the lamps are automatically turned to angles corresponding with the angles assumed by the steering wheels of the vehicles thus insuring the projection of the rays of light from the lamp on that part of the road upon which the vehicle is about to proceed.

More specifically, the invention embodies amongst other features, a rod connected to each of the steering knuckles of the front wheels, the rod terminating in spaced relation to the depending lamp supporting standards, a yieldable connection being utilized for said parts so that the vibration of the front axle and associated parts will not be transmitted to the lamp.

The lamp turning mechanism is of simple, cheap and practical construction and may be readily applied to any motor vehicle either at the time of manufacture thereof, or at any time subsequent thereto.

The nature and advantages of the invention will be better understood when the following detail description is taken in connection with the accompanying drawings, the invention residing in the construction, combination and arrangement of parts as claimed.

In the drawing forming part of this specification, like numerals of reference indicate similar parts in the several views and wherein.

Figure 1:
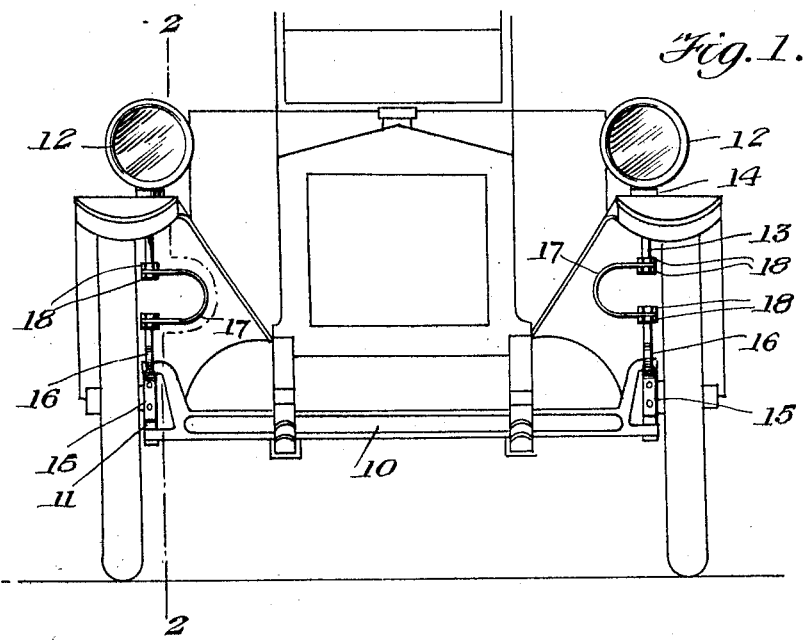
Figure 1 is a front elevation of an automobile equipped with the improved lamp turning mechanism.
Figure 2:
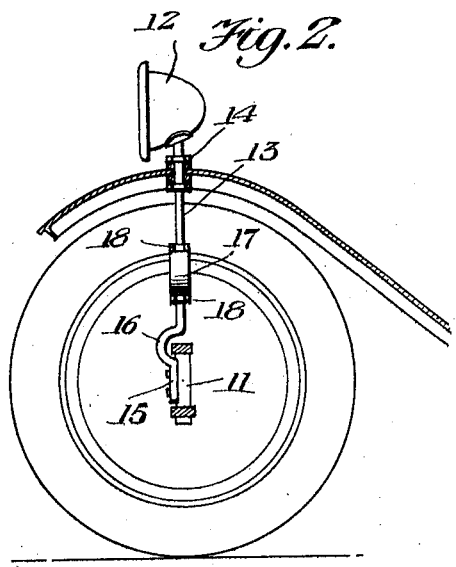
Figure 2 is a sectional view taken on the line 2—2.

Referring to the drawings in detail, 10 indicates the axle of the machine, the ends of which are equipped with the usual steering knuckles 11. The lamps are indicated at 12 and arranged upon the fenders of the car, being supported by standards 13 which are journaled in suitable bearings 14 carried by the fenders and which permit the lamps to be passed in either direction.

The lamp turning mechanism for each lamp comprises a rod having one end fastened in any suitable manner as at 15 to the steering knuckle 11. The intermediate portion of the rod is curved as at 16 to clear the adjacent edge of the axle and to dispose the upper extremity of the rod in axial alinement with the steering knuckle 11 and the lamp supporting standard 13. The lamp supporting standard 13 depends from the center an appreciable distance and is adapted to be connected with the adjacent end of the rod so that when the steering knuckle is turned, the lamp will be turned to angles corresponding with the angles assumed by the steering wheels of the vehicle. In accordance with the preferred embodiment of the invention, the connection between the standard 13 and the adjacent end of said rod is in the nature of a substantially U-shaped spring 17 the free terminals of which are provided with openings to receive the adjacent ends of said rod and standard 13, the free ends of the spring being secured in said parts between suitable clamping nuts 18. Manifestly, when the machine is passing over rough ground, the vibrations of the front axle are absorbed by the flexible and resilient connection between the rod 16 and the standard 13, without transmitting the vibration to the lamp. However, when the front wheels are turned by the steering wheels, the spring 17 provides the proper connection between the rod 16 and the standard 13 to turn the lamps correspondingly.

While I have shown and described what I consider the preferred embodiment of the invention, I desire to have it understood that I do not limit myself in this connection, and that such changes may be resorted to when desired as fall within the scope of what is claimed.

What I claim is:

In an automobile, the combination with a steering knuckle and a lamp supporting standard arranged above the knuckle, of a rod terminally secured to the knuckle and having its opposite end disposed above the latter and in aline with the standards, a substantially U-shaped spring interposed between the adjacent ends of the rod and said standard, the rims of said spring being arranged in superimposed relation with the closed end of the spring extended inwardly in a direction away from the wheel, the rims of said spring having alined openings to receive the said rod and standard, and nuts associated with said rod and standard for holding the latter associated with the spring for the purpose specified.

In testimony whereof I affix my signature.

FILER S. SEE.